UNITED STATES PATENT OFFICE.

CHARLES EDWARD NORTH, OF MONTCLAIR, NEW JERSEY, ASSIGNOR OF ONE-HALF TO EARLE B. PHELPS, OF WASHINGTON, DISTRICT OF COLUMBIA.

CLEANSING AND STERILIZING PREPARATION.

1,339,783.  Specification of Letters Patent.  Patented May 11, 1920.

No Drawing.  Application filed April 13, 1917. Serial No. 161,809.

*To all whom it may concern:*

Be it known that I, CHARLES E. NORTH, a citizen of the United States, residing at Montclair, in the county of Essex and State of New Jersey, have invented a certain new and useful Cleansing and Sterilizing Preparation, of which the following is a specification.

This invention relates to cleansing and disinfecting preparations, and particularly to preparations for cleansing and sterilizing food containers such as milk bottles and the like.

The desirable characteristics of such a preparation are many. It must be cheap, harmless, and easily packed, stored and used. It must not be subject to rapid deterioration or decomposition, and must have a pronounced germicidal as well as a cleansing action. A further requirement imposed by practically every health department, is that it must not leave in the container any residue which may exert any germicidal or disinfecting action upon the milk or other food stuff to be placed in the container.

Calcium hypochlorite, the active principle of commercial bleaching powder or chlorid of lime, has long been known as a cheap and effective disinfectant, but its use in this particular field is attended with serious and heretofore unsurmounted difficulties. It is unstable, breaking down, particularly in a moist atmosphere, and evolving chlorin gas. This takes place to a considerable extent even when the hypochlorite is stored in air tight containers and involves a serious loss of germicidal strength. The transfer, storage and use of calcium hypochlorite thus involves serious difficulties. Furthermore, the use of calcium hypochlorite solution for cleansing food containers and particularly milk bottles is very frequently objected to by health authorities because of the undecomposed residue which it leaves upon drying which would exert a forbidden germicidal action in the milk.

My present invention overcomes all the difficulties above outlined and makes possible the safe and successful use of calcium hypochlorite in cleansing and sterilizing food containers.

The preparation consists of a mixture of sodium carbonate, (preferably anhydrous sodium carbonate) and calcium hypochlorite, (preferably commercial bleaching powder) in equal parts by weight. The proportions may be varied, the important point being that the quantity of sodium carbonate, or its equivalent, present in the mixture, be sufficient to insure that its drying effect shall predominate, thus preventing the decomposition of the hypochlorite by atmospheric moisture. As suggested above, and as hereinafter more fully set forth, certain substitutions or partial substitutions, particularly for the sodium carbonate, may be made. For example, sufficient sodium carbonate may be used to secure the drying effect, the remainder being replaced by a substantially equivalent alkaline compound to assure the desired alkalinity. Whether the sodium carbonate be used alone or with another alkaline compound, the hypochlorite should constitute approximately 50 per cent. and the sodium carbonate preparation the remainder of the mixture.

The resulting product is a dry free-flowing white powder which does not evolve chlorin in any substantial quantity even when exposed to the atmosphere and which consequently is not subject to any serious loss of strength. It is used in water solution of any desired strength with or without soap and may be incorporated or mixed with commercial soap powders, if desired.

The addition of sodium carbonate, or its equivalent, has several distinct and beneficial effects, which I shall enumerate in detail in order that the properties of the resulting mixture in comparison with simple calcium hypochlorite may be fully understood.

Commercial bleaching powder, an impure mixture of equi-molecular proportions of calcium chlorid and calcium hypochlorite is a deliquescent substance and in the dryest condition in which it can be normally maintained decomposes, evolving chlorin. In a closed receptacle it reaches equilibrium with a concentrated and highly colored chlorin atmosphere and decomposition then ceases, but when open to the air decomposition is continuous and rapid and is accelerated markedly by moisture and absorbed carbon dioxid from the atmosphere. In the mixture which forms the subject of the present invention the decomposing effect of the moisture of the atmosphere is avoided by the drying and efflorescent action of the sodium carbonate, or its equivalent. Furthermore, by reason of the alkalinity produced by the sodium carbonate the decomposition caused by carbon dioxid is almost entirely prevented. That the decomposition is rendered practically negligible is evidenced by the fact that the chlorin gas escaping from and in equilibrium with the mixture in a closed bottle is invisible and hardly detectable by the sense of smell.

Thus the alkalinity and the drying effect of the sodium carbonate stabilize the hypochlorite by neutralizing the causes of its spontaneous decomposition, and these properties of the mixture are important features of the invention.

In addition to this stabilizing effect there is an improved germicidal action. In experiments made in connection with the present invention, the discovery has been made that in the presence of organic matter hypochlorites are more active disinfectants in alkaline solutions than in either neutral or acid solutions. Apparently a hypochlorite tends to perform simultaneously two distinct functions, (1) oxidation of organic matter, and (2) destruction of bacteria by toxic action. The oxidation consumes the hypochlorite without serving any useful purpose, and oxidation being retarded in alkaline solution, the use of such a solution involves a marked gain in germicidal effect. The characteristic feature of producing, when dissolved, an alkaline hypochlorite solution is an important property of my preparation and is a feature of the invention.

A further advantage of my preparation is that the resulting solution is that of an evanescent salt. Sodium hypochlorite has many advantages over calcium hypochlorite but does not exist in the dry state. This invention provides a dry powder, which by reaction between its constituents produces when dissolved a solution of sodium hypochlorite. Among the advantages of sodium hypochlorite are freedom from reaction with soap after the characteristic manner of "hard" or calcium bearing waters, greater solubility, and increased germicidal efficiency due to the greater degree of hydrolysis and the correspondingly increased alkalinity of the solution. The supremely important feature of advantage arises, however, from the fact that sodium hypochlorite does not exist in the dry or solid state, but breaks down, when forced out of solution, into oxygen and sodium chlorid. Thus the mere drying of the containers precludes the carrying of any disinfectant into the food. While sodium hypochlorite solutions have been known, and their germicidal properties to a certain extent understood, their preparation has heretofore involved the use of two solutions separately prepared and subsequently mixed and they were unstable and not adapted to commercial uses. My invention produces a powder which is readily shipped and stored and which upon being dissolved in water produces at once the desired solution.

The invention thus involves three features of characteristic advantage, (1) drying and stabilizing the hypochlorite, (2) increase of germicidal efficiency by provision of alkaline solution and (3) the evanescent character of the disinfectant salt present in the resultant solution. To a certain extent these advantages are independent and may be sesured individually and in combination by mixtures in which partial or complete substitutions for the sodium carbonate and calcium hypochlorite are made. Such mixtures fall within the broad scope of the invention but are not considered to be as desirable as the mixture suggested.

For example: All the advantages of the described mixture except permanent dryness can be secured in a useful degree by the use of either caustic soda or caustic potash in lieu of sodium carbonate. A partial substitution of caustic soda or caustic potash for sodium carbonate would permit the retention of the feature of dryness in a degree dependent upon the amount of sodium carbonate present. The partial substitution for sodium carbonate of other soluble alkaline carbonates or bicarbonates, such as those of potassium or ammonium will produce a mixture having all three desirable characteristics in a useful degree. The best known substitutes for sodium carbonate are efflorescing alkali salts. Magnesium hypochlorite may be substituted in whole or in part for calcium hypochlorite in some of the cases mentioned and produce a useful mixture.

The important inventive idea is the production of a preparation involving the physical, chemical and germicidal properties and principles above described. The exact ingredients and proportions are subject to variation by the exercise of ordinary chemical skill and such variation is contemplated within the limits defined in the claims.

Because some range is permissible in the selection of component substances, and in their proportions, I shall in certain of the claims define the invention in terms of the drying effect of the desiccating agent and the deliquescing tendency of the hypochlorite. The limit of useful effect so far as the features of stability is concerned, is marked by the predominance of the drying effect of one substance over the deliquescing tendency of the other, and mixtures of the nature specified falling within this limit embody my invention. Consequently in the claims I shall define the quantity of desiccating agent such as sodium carbonate or equivalent efflorescing alkali salt with reference to the hypochlorite by specifying that its drying effect shall predominate in the mixture.

It should particularly be noted that the purpose of the invention is to provide a stable and dry preparation ready to be dissolved in water, at the time of use, to produce a cleansing and disinfecting solution.

Having thus described my invention, what I claim is:—

1. As a new article of manufacture, a stable, dry disinfecting preparation, containing calcium hypochlorite and a desiccating agent in such proportion as shall cause the drying action of the desiccating agent to predominate over the deliquescing tendency of the calcium hypochlorite.

2. As a new article of manufacture, a stable, dry disinfecting preparation, containing a hypochlorite and an alkali salt capable of exerting, and present in quantity to maintain, a drying effect on said hypochlorite.

3. As a new article of manufacture, a stable, dry disinfecting preparation, containing a hypochlorite and an alkali carbonate capable of exerting, and present in quantity to maintain, a drying effect on said hypochlorite.

4. As a new article of manufacture, a stable dry disinfecting preparation, containing calcium hypochlorite, and a sodium compound capable of exerting, and present in quantity to maintain, a drying effect on said hypochlorite, and capable of reacting therewith, when dissolved, to produce a sodium hypochlorite solution.

5. As a new article of manufacture, a stable dry disinfecting preparation, containing calcium hypochlorite and sodium carbonate, the carbonate being present in quantity sufficient to check the deliquescing tendency of the hypochlorite.

6. As a new article of manufacture, a stable dry disinfecting preparation, composed of bleaching powder and sodium carbonate, the carbonate being present in quantity sufficient to check the deliquescing tendency of the bleaching powder.

7. As a new article of manufacture, a stable dry disinfecting preparation, composed of bleaching powder and sodium carbonate in substantially equal parts by weight.

In testimony whereof I have signed my name to this specification.

CHARLES EDWARD NORTH.